US 12,055,090 B2

(12) United States Patent
Douglas (10) Patent No.: US 12,055,090 B2
(45) Date of Patent: Aug. 6, 2024

(54) TURBOCHARGED ENGINE SYSTEM AND A METHOD OF CONTROLLING BOOST PRESSURE

(71) Applicant: Bowman Power Group Limited, Southamptom (GB)

(72) Inventor: Keith Douglas, Southampton (GB)

(73) Assignee: Bowman Power Group Limited, Southampton (GB)

( * ) Notice: Subject to any disclaimer, the term of this patent is extended or adjusted under 35 U.S.C. 154(b) by 0 days.

(21) Appl. No.: 17/995,047

(22) PCT Filed: Mar. 10, 2021

(86) PCT No.: PCT/GB2021/050591
§ 371 (c)(1),
(2) Date: Sep. 29, 2022

(87) PCT Pub. No.: WO2021/205139
PCT Pub. Date: Oct. 14, 2021

(65) Prior Publication Data
US 2023/0146605 A1  May 11, 2023

(30) Foreign Application Priority Data
Apr. 9, 2020 (GB) .................................. 2005315

(51) Int. Cl.
*F02B 37/10* (2006.01)
*F02B 37/013* (2006.01)
(Continued)

(52) U.S. Cl.
CPC ............ *F02B 37/10* (2013.01); *F02B 37/013* (2013.01); *F02B 37/16* (2013.01); *F02B 37/20* (2013.01); *F02B 39/10* (2013.01); *F02D 23/00* (2013.01)

(58) Field of Classification Search
CPC ........ F02B 37/00; F02B 37/20; F02B 37/168; F02B 39/10; F02B 37/16; F01N 3/323
See application file for complete search history.

(56) References Cited

U.S. PATENT DOCUMENTS 9,316,180 B2   4/2016   Heiermann
9,404,413 B2   8/2016   Schmalzing et al.
(Continued)

FOREIGN PATENT DOCUMENTS

DE   102010043027 A1   5/2012
DE   102011079036 A1   1/2013
(Continued)

OTHER PUBLICATIONS

International Search Report and Written Opinion of International Application No. PCT/GB2021/050591, dated Jun. 18, 2021, 15 pp.

*Primary Examiner* — Ngoc T Nguyen
(74) *Attorney, Agent, or Firm* — Shumaker & Sieffert, P.A.

(57) ABSTRACT

A turbocharged engine system with electric compressor arranged to inject a compressed fluid into the exhaust subsystem upstream of the turbine of the turbocharger such that, in use, the compressed fluid injected by the electric compressor into the exhaust subsystem maintains the speed of or accelerates the turbine, thereby maintaining or increasing the boost pressure supplied to the turbocharged internal combustion engine. A method of controlling the boost pressure supplied to an internal combustion engine by a turbocharger, said method comprising the steps of: producing a stream of compressed fluid; injecting the stream of compressed fluid into an exhaust stream of the internal combustion engine to produce a pressure-boosted exhaust stream; and controlling the speed of a turbine of the turbocharger (Continued)

using the pressure-boosted exhaust stream to control the boost pressure supplied to the internal combustion engine.

13 Claims, 4 Drawing Sheets

(51) Int. Cl.
　　　*F02B 37/16*　　　(2006.01)
　　　*F02B 37/20*　　　(2006.01)
　　　*F02B 39/10*　　　(2006.01)
　　　*F02D 23/00*　　　(2006.01)

(56) References Cited

U.S. PATENT DOCUMENTS

| | | | |
|---|---|---|---|
| 9,719,438 B2 * | 8/2017 | Almkvist | F02B 29/02 |
| 2013/0232972 A1 * | 9/2013 | Heiermann | F02M 26/24 |
| | | | 60/605.2 |
| 2014/0026538 A1 | 1/2014 | Hauser et al. | |
| 2018/0274436 A1 * | 9/2018 | Kemmerling | F02B 37/162 |

FOREIGN PATENT DOCUMENTS

| | | | | |
|---|---|---|---|---|
| DE | 102019203849 A1 * | 9/2020 | | |
| EP | 3957838 A1 * | 2/2022 | | F01N 3/0205 |
| GB | 2121474 A | 12/1983 | | |
| WO | 2010039197 A1 | 4/2010 | | |
| WO | 2019185107 A1 | 10/2019 | | |

* cited by examiner

TURBOCHARGED ENGINE SYSTEM AND A METHOD OF CONTROLLING BOOST PRESSURE

This application is a national stage application under 35 U.S.C. § 371 of PCT Application No. PCT/GB2021/050591, filed Mar. 10, 2021, which claims the benefit of Great Britain Application No. 2005315.3, filed Apr. 9, 2020. The entire contents of both PCT Application No. PCT/GB2021/050591 and Great Britain Application No. 2005315.3 are incorporated herein by reference.

FIELD OF THE INVENTION

The present invention relates to a turbocharged engine system comprising an electric compressor and, in particular, to a system where the electric compressor is arranged to inject a compressed fluid into the exhaust subsystem of turbocharged engine upstream of the turbocharger. Further, the present invention relates to a method of controlling the boost pressure supplied to a turbocharged engine by injecting a stream of compressed fluid into an exhaust stream of the engine upstream of the turbocharge.

BACKGROUND OF THE INVENTION

Internal combustion engines are often accompanied by a turbocharger within an engine system. The turbocharger increases the efficiency of an engine system by extracting work from hot exhaust gases emitted by the internal combustion engine and using this work to force air into the internal combustion engine; increasing the mass of air available for combustion. This increase in the pressure or mass of the air entering the internal combustion engine is commonly known as boost pressure or boost. The use of a turbocharger can improve the power output and/or improve fuel efficiency of the internal combustion engine and reduce emissions of certain species such as particulate matter and nitrous oxides $NO_x$.

Nevertheless, turbocharged internal combustion engines suffer from several drawbacks. For example, present systems are often unable to increase engine load rapidly in response to transient load events, due to a lag between the event and the turbocharger's ability to increase the boost pressure. This lag is commonly known as turbo lag.

A number of technologies or solutions exist to reduce turbo lag. However, each of these technologies possesses significant drawbacks itself.

For example, superchargers—which are also known as electric superchargers, E-compressors, electric compressors—inject air mass into a turbocharged internal combustion engine prior to combustion. However, the ability of superchargers to reduce turbo lag is limited by the turbocharger compressor surge line and, therefore, the rate at which the boost pressure and engine load can be increased is limited and turbo lag is still observed.

E-turbochargers—also known as electrically assisted turbochargers or e-turbos—aim to solve turbo lag by electrically assisting the acceleration of the turbocharger and thereby improving responsiveness. However, electrically assisted turbochargers are often difficult to design, integrate and control such that their associated costs often significantly outweigh their benefits. Furthermore, it is typically not possible to convert an existing turbocharger into an e-turbocharger, limiting this the application of this technology.

Another potential solution is the use of variable geometry turbochargers. In this type of turbocharger, the aspect ratio of turbocharger can be changed to suit the engine load and thereby reduce turbo lag. However, variable geometry turbochargers are costly and complex to design and are often unreliable due to the inherent incompatibility of high temperatures and the intricate moving parts required to adjust the aspect ratio. For these reasons, variable geometry turbochargers are typically not designed or used with larger, more powerful internal combustion engines or efficient high-temperature internal combustion engines.

Objects and aspects of the present invention aim to alleviate the problems associated with the turbocharged internal combustion engines and the present technologies used to reduce turbo lag.

SUMMARY OF THE INVENTION

According to a first aspect of the present invention, there is provided a turbocharged engine system comprising: an internal combustion engine, the internal combustion engine in fluid communication with an intake subsystem and an exhaust subsystem; a turbocharger arranged to supply a boost pressure to the internal combustion engine via a turbine coupled to a compressor wheel, the turbine being located in the exhaust subsystem and the compressor wheel being located in the intake subsystem; and an electric compressor arranged to inject a compressed fluid into the exhaust subsystem upstream of the turbine such that, in use, the compressed fluid injected by the electric compressor into the exhaust subsystem maintains the speed of or accelerates the turbine and thereby maintains or increases the boost pressure supplied to the internal combustion engine by the turbocharger.

The injection of the compressed fluid, typically compressed air, into the exhaust subsystem by the electric compressor can be used to maintain the speed of or accelerate the turbine as the mass flow through and the expansion ratio across the turbine has been maintained or increased. This in turn maintains the speed of or accelerates the compressor wheel of the turbocharger which maintains or increases the boost pressure supplied to the engine due to the power imbalance between the compressor wheel and the turbine of the turbocharger. Since the electric compressor can be controlled independently to and can respond more quickly than the turbocharger, the electric compressor can effectively assist in controlling the boost pressure supplied and make the turbocharger more responsive. In this way, the turbo lag and transient load acceptance response times can be reduced.

The turbocharged engine system in accordance with the present invention is particularly beneficial for systems used in the high and medium power generation markets as it improves cold/pre-heated engine start times opening the potential for natural gas engines in the grid balancing, secondary frequency, emergency standby and datacentre markets. These markets are currently dominated by the less efficient and more polluting diesel engines. Another benefit of the turbocharged engine system is that the base design of the engine, efficiency or peak load of the engine do not need to be sacrificed in order to incorporate the electric compressor.

Furthermore, the provision of such an electric compressor is beneficial as once the desired boost pressure has been achieved the amount of compressed fluid supplied by the electric compressor can be reduced to avoid increasing the boost pressure over a desired or optimal value. In this way, the electric compressor can prevent the boost pressure from negatively affecting the internal combustion engine or its performance by, for example, overloading.

The provision of an electric compressor is also advantageous over other solutions to reducing turbo lag as it can be retrofitted to existing turbocharged engine systems relatively easily as only the exhaust subsystem needs to be altered to allow the injection of compressed fluid from the electric compressor.

The turbocharged engine system may comprise one or more control valves arranged to control the injection of the compressed fluid into the exhaust by the electric compressor. Control over the injection of the compressed fluid by the one or more control valves may comprise controlling the timing, pressures and quantity of the injection. The provision of one or more control valves is advantageous as it affords an additional way to control the amount, or mass flow, or timing, of compressed fluid injected into the exhaust subsystem.

The one or more control valves may comprise one or more of an isolator valve, a blow-off valve, a check valve and a bypass valve alone or in any combination.

Preferably, the turbocharged engine system comprises two control valves. In one preferred embodiment, the two control valves are an isolator valve and a bypass valve. In a second preferred embodiment, the two control valves are a blow-off valve and a check valve.

Preferably, one or more of the control valves are arranged to be mechanically actuated. Preferably, one or more control valves are arranged to be mechanically actuated at set, or pre-determined, pressures.

Preferably, one or more of the control valves are arranged to be electronically controlled.

Preferably, one or more of the control valves are arranged to be an open-close valve. An open-close valve can only be set to a fully open position or a fully closed position. The provision of open-close valve is beneficial as it simplifies controlling the actuation of the control valves.

Alternatively, one or more of the control valves are arranged to have full authority over their position, such that they can be set to any position intermediate to the open position and the close position. The provision of control valves with full authority of their position improves the level of control afforded over the amount, or mass flow, or timing, of compressed fluid injected into the exhaust subsystem.

The one or more control valves may comprise an isolator valve arranged to prevent or inhibit the stream of compressed fluid into the exhaust subsystem. Usually, actuation of the isolator valve controls the flow of the compressed fluid into the exhaust subsystem by partially or fully occluding the conduit along which the stream of compressed fluid is flowing. Typically, the isolator valve is located between the electric compressor and exhaust subsystem. Additionally, the isolator valve can be actuated to prevent the back flow, which when exhaust fluid in the exhaust subsystem flows towards the electric compressor, The one or more control valves may comprise a bypass valve arranged to bypass the electric compressor. The bypass valve can be actuated to lower the pressure of the compressed fluid as well as increasing the mass flow through the electric compressor by mixing it with non-compressed fluid, typically air. This is particularly advantageous when the operating point of the electric compressor approaches the surge line i.e. when the compressor ratio increases or the mass flow through the compressor decreases. Thus, the bypass valve can prevent compressor surge events on the electric compressor.

The one or more control valves may comprise a blow-off valve arranged to control the venting of the compressed fluid produced by the electric compressor into the external environment. Compressed fluid can be vented to limit the pressure of the pressure-boosted stream and therefore the boost pressure supplied to the internal combustion engine. This is particularly advantageous when the operating point of the electric compressor approaches the surge line. Thus, the blow-off valve can prevent compressor surge events on the electric compressor. Additionally, compressed fluid can be vented to allow the electric compressor to accelerate to a desired speed at a lower pressure putting less load on the electric motor and speeding up the acceleration of the electric motor.

The one or more control valves may comprise a check valve arranged to prevent fluid in the exhaust subsystem flowing towards the electric compressor. The check valve—also known as a clack valve, non-return valve, reflux valve, retention valve or one-way valve—prevents the flow of exhaust fluid from exhaust subsystem towards the electric compressor. Additionally, the provision of a check valve controls the injection of compressed fluid as fluid will only be injected into the exhaust subsystem when the pressure of the compressed fluid is greater than the pressure of the fluid within the exhaust subsystem.

According to a second aspect of the present invention there is provided a method of controlling the boost pressure supplied to an internal combustion engine by a turbocharger, said method comprising the steps of:
  producing a stream of compressed fluid;
  injecting the stream of compressed fluid into an exhaust stream of the internal combustion engine to produce a pressure-boosted exhaust stream; and
  controlling the speed of a turbine of the turbocharger using the pressure-boosted exhaust stream such that the boost pressure supplied to the internal combustion engine is controlled.

The production of a stream of compressed fluid and the injection of the stream of compressed fluid afford control over the speed of the turbine. In this way, method provides control over the amount, or mass flow, or timing, of the stream of compressed fluid injected into the exhaust stream. Thus, turbo lag of the turbocharged internal combustion engine can be reduced as the turbocharger can be independently controlled by injection of the compressed fluid into the exhaust stream. This advantageously improves the response of the turbocharged engine to transient load events.

Preferably, the method controls the boost pressure supplied to the internal combustion engine by maintaining or increasing the boost pressure supplied to the internal combustion engine, such that the step of controlling the speed of the turbine comprises the step of maintaining the speed of or accelerating the turbine of the turbocharger using the pressure-boosted exhaust stream, thereby maintaining or increasing the boost pressure supplied to the internal combustion engine.

Increasing the boost pressure by accelerating the turbine using the injected stream of compressed fluid can be advantageously used to reduce turbo lag. Maintaining the boost pressure by maintaining the speed of the turbine using the injected stream of compressed fluid can be advantageously used to respond to fault conditions. For example, if the internal combustion engines experiences a fault condition such as coming off load, the boost pressure can be maintained such that the internal combustion engine can spin up more quickly, which saves time during its acceleration and reduces the impact of the fault condition.

The method may comprise the additional step of reducing the amount, or mass flow, of compressed fluid injected into the exhaust stream when the load of the internal combustion engine or boost pressure approaches, achieves or exceeds a threshold or predetermined value. The boost pressure may represent the surge line of turbocharger.

Preferably, the method comprises the additional step of reducing the amount, or mass flow, of compressed fluid injected into the exhaust stream when the load of the internal combustion engine, or engine load, or boost pressure achieves or exceeds a threshold or predetermined value.

Preferably, the step of reducing the amount of compressed fluid injected into the exhaust stream comprises a step of reducing the pressure of the compressed fluid stream.

Preferably, the step of reducing the amount of compressed fluid injected into the exhaust stream comprises a step of restricting the flow of compressed fluid into the exhaust stream.

Preferably, the method comprises an additional step of increasing the amount, or mass flow, of the compressed fluid injected into the exhaust stream when the load of the internal combustion engine, or engine load, or boost pressure approaches, is below or falls below a threshold or predetermined value.

Preferably, the method comprises an additional step of increasing the amount, or mass flow, of the compressed fluid injected into the exhaust stream when the load of the internal combustion engine or boost pressure is below or falls below a threshold or predetermined value.

Preferably, the step of increasing the amount, or mass flow, of the compressed fluid injected into the exhaust stream comprises a step of increasing the pressure of the compressed fluid stream.

Preferably, the step of increasing the amount, or mass flow, of the compressed fluid injected into the exhaust stream comprises a step of increasing the flow of compressed fluid into the exhaust stream.

Preferably, the step of increasing the amount, or mass flow, of the compressed fluid injected into the exhaust stream comprises a step of increasing the proportion of the compressed fluid stream that is injected into the exhaust stream.

Preferably, the step of reducing the amount, or mass flow, of compressed fluid injected into the exhaust stream or the step of increasing the amount of the compressed fluid injected into the exhaust stream comprises a step of venting at least some of the compressed fluid into the external environment or bypassing the electric compressor.

Preferably, the step of reducing the amount, or mass flow, of compressed fluid injected into the exhaust stream comprises a step of venting at least some of the compressed fluid into the external environment.

Preferably, the step of increasing the amount, or mass flow, of the compressed fluid injected into the exhaust stream comprises a step of bypassing the electric compressor. Preferably, the step of bypassing the electric compressor comprises feeding the stream of compressed fluid back into the electric compressor. In this way, the electric compressor can be ramped or span up to a desired speed and produce a desired pressure prior to the injection of stream of compressed fluid into the exhaust stream.

Preferably, the stream of compressed fluid is compressed air. One advantage of using compressed air is the readily availability of air such that a dedicated fluid supply or tank is not required.

DETAILED DESCRIPTION OF THE INVENTION

Embodiments of the present invention will now be described by way of example only and with reference to the accompanying drawings, in which.

Figure 1:
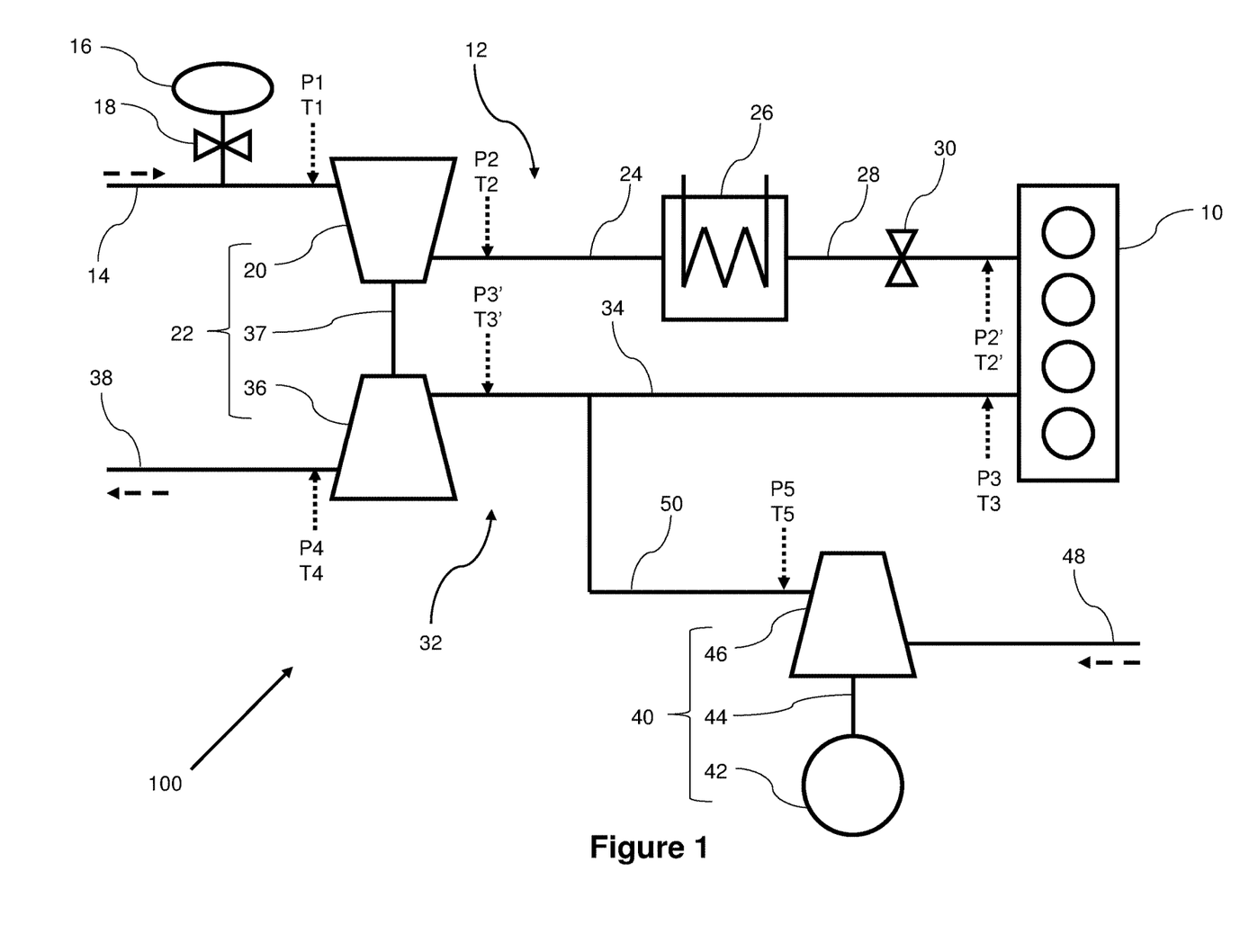
FIG. 1 is a schematic drawing of a first embodiment of a turbocharged engine system in accordance with present invention, the system of this embodiment comprises an electric compressor that is arranged to inject a compressed fluid into the exhaust subsystem of the engine upstream of the turbine of the turbocharger.

FIG. 1 of the drawings depicts a schematic drawing of the first embodiment of a turbocharged engine system 100 in accordance with present invention.

When the turbocharged engine system 100 of FIG. 1 is operational, a mixture of air and fuel is supplied to an internal combustion engine 10 via an intake subsystem 12. In this embodiment, and the subsequent embodiments, the internal combustion engine 100 is a spark-ignition engine. Other embodiments are envisaged for different types of internal combustion engine known in the art, such as compression-ignition engines.

The intake subsystem 12 comprises an air inlet conduit 14 with an aperture through which air is drawn into the intake subsystem 12. This air is mixed with fuel from the gas supply 16 in the air inlet conduit 14. The flow of fuel from the gas supply 16 to the air inlet conduit 14 is controlled by a fuel control valve 18. The air and fuel mixture in the air inlet conduit 14 has a pressure P1 and a temperature T1 that can be measured by sensors (not shown) incorporated into the air inlet conduit 14.

During operation, the air inlet conduit 14 supplies the air and fuel mixture to a compressor wheel 20 of a turbocharger 22, where the mixture is compressed. The increased mass and pressure of the air and fuel mixture by the action of the compressor wheel 20 of the turbocharger 22 is known as the boost pressure or the boost. This compression of the air and fuel mixture by the compressor wheel 20 of the turbocharger 22 results in additional air being drawn into the air inlet conduit 14 as is well known in the art.

The intake subsystem 12 further comprises a radiator inlet conduit 24 that supplies the compressed air and fuel mixture exiting the compressor wheel 20 to a radiator 26. The compressed air and fuel mixture in the radiator inlet conduit 24 has a pressure P2 and temperature T2 that can be measured by sensors (not shown) incorporated into the radiator inlet conduit 24. The pressure P2 of the air and fuel mixture inside the radiator inlet conduit 24 is greater than the pressure P1 of the air and fuel mixture inside the air inlet conduit 14 due to the boost pressure imparted on the mixture by the compressor wheel 20 of the turbocharger 20.

The radiator 26 cools the compressed air and fuel mixture to provide a cooled and compressed air and fuel mixture to an engine inlet conduit 28. The cooled and compressed air and fuel mixture in the engine inlet conduit 28 has a pressure P2' and temperature T2' that can be measured by sensors (not shown) incorporated into the engine inlet conduit 28. The radiator 26 and the engine inlet conduit 28 are part of the intake subsystem 12.

The engine inlet conduit 28 channels the cooled compressed air and fuel mixture from the radiator 26 to the internal combustion engine 10. During operation, the flow of the cooled compressed air and fuel mixture along the inlet engine conduit 26 into the internal combustion engine 10 is controlled by a throttle 30 in a manner as in known in the art.

During operation of the turbocharged engine system 100, the internal combustion engine 10 combusts the cooled and compressed air fuel mixture producing mechanical power. The greater mass of air entering the engine 10 because of the action of the compressor wheel 20 of the turbocharger 22 can be used to increase the power output and/or fuel efficiency of the engine as well as reducing the emissions of certain species such as nitrous oxides $NO_x$.

The combustion of the air and fuel mixture by the internal combustion engine 10 also produces waste or exhaust fluids that are expelled from the internal combustion engine 10 into the external environment via an exhaust subsystem 32.

The exhaust subsystem 32 comprises an engine exhaust conduit 34 along which the exhaust fluids from the internal combustion engine 10 flow to a turbine 36 of the turbocharger 22. The pressure P3 and temperature T3 of the exhaust fluid egressing the engine 10 can be measured by sensors (not shown) incorporated into the engine exhaust conduit 34.

The turbine 36 is rotationally connected or coupled to the compressor wheel 20 by a turbocharger shaft 37. Together the turbine 36, the turbocharger shaft 37 and the compressor wheel 20 make up the turbocharger 20.

The flow of the hot pressurised exhaust fluids from the engine exhaust conduit 34 rotates the turbine 36 that in turn drives the rotation of the turbocharger shaft 37 and the compressor wheel 20. This power imbalance between the turbine 36 and the compressor wheel 20 causes it to compress the air and fluid mixture in intake subsystem 12, increasing the air mass entering the engine 10, as is known in the art for turbocharged engines.

After rotating the turbine 36, the exhaust fluid is egressed through an exhaust conduit 38. The exhaust conduit 38 forms part of the exhaust subsystem 32. The pressure P4 and temperature T4 of the exhaust fluid within the exhaust conduit 38 can be measured by sensors (not shown) incorporated into the exhaust conduit 38. The exhaust conduit 38 egress, or exhausts, the exhaust fluid into the environment via aftertreatment, heat recovery, noise attenuation or whatever equipment is installed downstream of the engine.

In accordance with the present invention, the exhaust subsystem 32 is fluidly connected with an electric compressor 40. The electric compressor 40 comprises an electric motor 42 that rotationally drives a compressor shaft 44 that is coupled to a compressor 46. The electric motor 42 is electrically connected to an external power source (not shown) such as the electrical grid or battery.

The rotation of the compressor 46 by the electric motor 42 draws in air through a compressor inlet conduit 48 and compresses it, boosting the pressure of the air. This pressure-boosted air is expelled from the compressor 46 into the compressor outlet conduit 50. The pressure P5 and temperature T5 of the pressure-boosted air from the electric compressor 40 can be measured by sensors (not shown) incorporated into the compressor outlet conduit 50.

The compressor outlet conduit 50 is fluidly connected to the engine exhaust conduit 34. The pressure-boosted air from the electrical compressor 40 is injected into the exhaust conduit 34 and mixed with the exhaust fluid in the engine exhaust conduit 34 to form a mixture of exhaust fluid and air in the engine exhaust conduit 34. The pressure P3' and temperature T3' of the exhaust fluid and air mixture can be measured by sensors (not shown) incorporated into the engine exhaust conduit 34 downstream of the fluid connection with the compressor outlet conduit 50. When the electric compressor 40 is running, the air and exhaust fluid mix within the exhaust conduit can have a pressure P3' that is greater than would be measured if the electric compressor 40 were not installed or operational By increasing the pressure P3' of the fluid entering the turbine 36 of the turbocharger 22, the boost pressure supplied to the engine 10 is increased as the compressor wheel 20 will rotate more quickly. In this way, the amount of boost pressure, i.e. the mass of air, supplied to engine 10 can be controlled by the speed of the electric motor 42 of the electric compressor 40. Increasing the speed of the electric motor 42 increases the pressure of air mixed with the exhaust fluid, thereby increasing the rotation of the turbocharger 22 and increasing the boost pressure supplied to the engine 10. This can be used to accelerate the turbocharger 22 and raise the boost pressure to a desired or optimal value when the internal combustion engine 10 is starting up or experiencing a transient load event.

Figure 2:
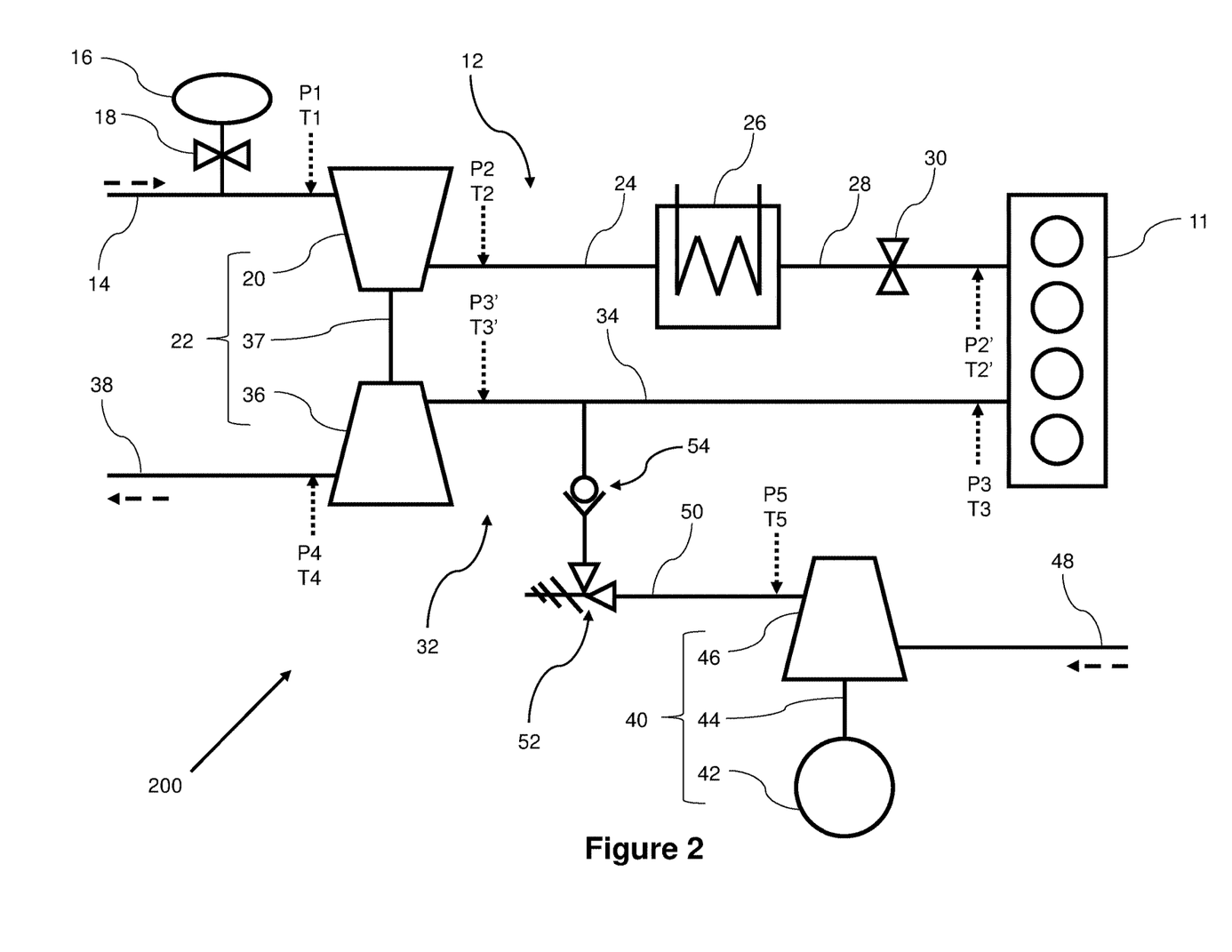
FIG. 2 is a schematic drawing of a second embodiment of a turbocharged engine in accordance with the present invention; the system of this embodiment comprises a check valve and a blow off valve to assist in the control of the electric compressor of the first embodiment.
Figure 3:
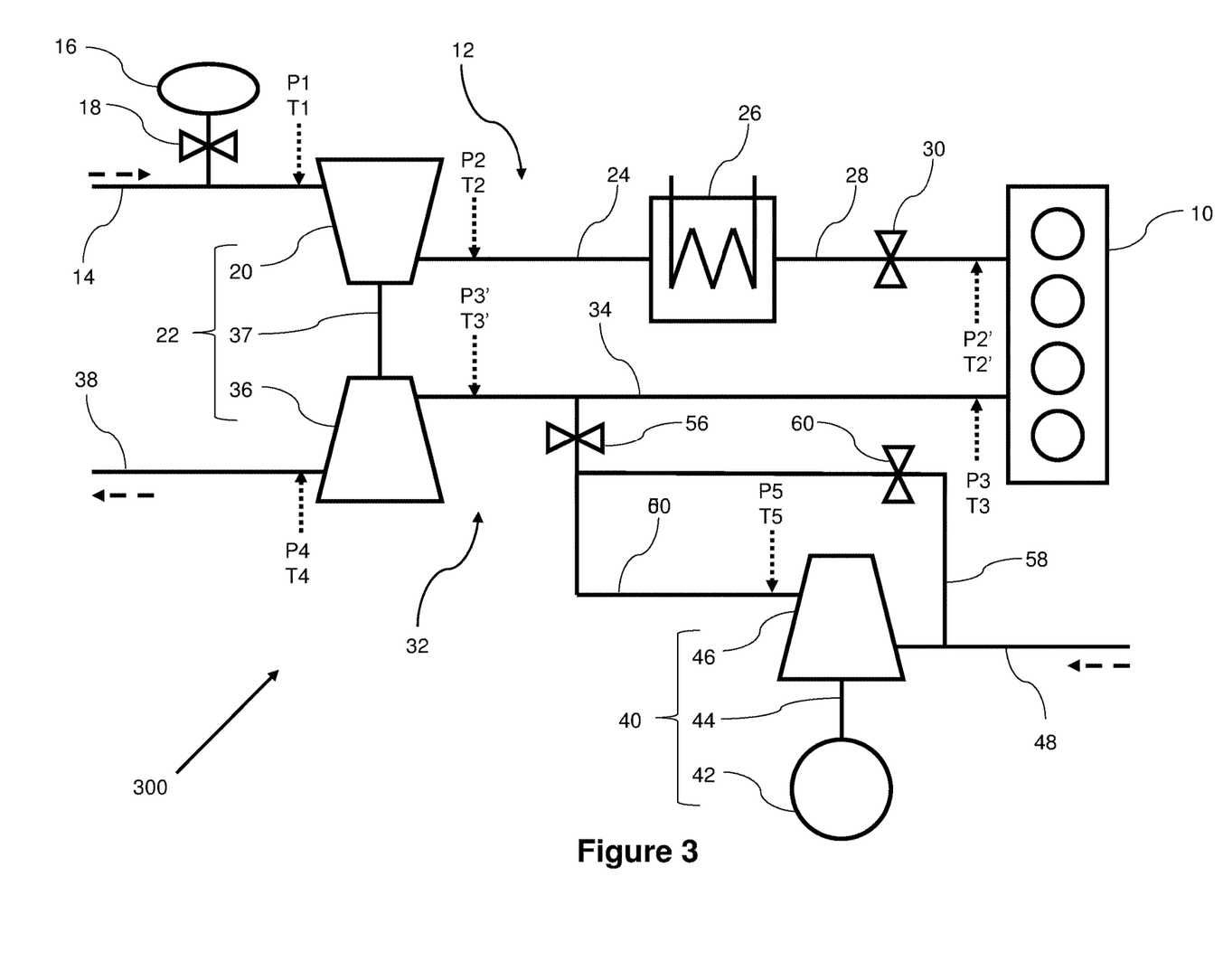
FIG. 3 is a schematic drawing of a third embodiment of a turbocharged engine in accordance with the present invention, the system of this embodiment comprises an isolator valve and a compressor bypass valve to assist in the control of the electric compressor of the first embodiment.

FIG. 2 and FIG. 3 of the drawings depict schematic drawings of a second embodiment of a turbocharged engine system 200 and a third embodiment of a turbocharged engine system 300 in accordance with present invention.

The following features of the second embodiment and third embodiment are substantially identical in structure and function to the equivalent features of the first embodiment in FIG. 1 and the reference numerals for these features are maintained across the embodiments and their respective figures: the internal combustion engine 10; the intake subsystem 12; the air inlet conduit 14; the gas supply 16; the fuel control valve 18; the compressor wheel 20; the turbocharger 22; the radiator inlet conduit 24; the radiator 26; the engine inlet conduit 28; the throttle 30; the exhaust subsystem 32; the engine exhaust conduit 34; the turbine 36; the turbocharger shaft 37; the exhaust conduit 38; the electric compressor 40; the electric motor 42; the compressor shaft 44; the compressor 46; the compressor inlet conduit 48; and compressor outlet conduit 50.

The second embodiment of the turbocharged engine system 200 in FIG. 2 and the third embodiment of the turbocharged engine system 300 in FIG. 3 differ from the first embodiment in that they comprise valves in series or parallel with the electrical compressor 40 to assist in controlling the flow of pressure-boosted air from the electrical compressor 40 into the engine exhaust conduit 34.

Referring to the second embodiment of the turbocharged engine system 200 in FIG. 2, the compressor outlet conduit 50 comprises a blow off valve 52 downstream of the electric compressor 40 and a check valve 54 downstream of the blow off valve 52 prior to the connection with the engine exhaust conduit 34.

The blow off valve 52 is configured to vent the pressure-boosted air produced by the electric compressor 40 into the environment prior to its entry into the exhaust subsystem 32.

The check valve 54 is configured to prevent the pressurized exhaust fluid in the engine exhaust conduit 34 from flowing through the compressor outlet conduit 50 towards and into the electric compressor 40. The check valve 54 can also be configured to open when the pressure P5 in the compressor outlet conduit 50; the pressure P3 in the engine exhaust conduit 34; or the pressure difference between the pressure P5 in the compressor outlet conduit 50 and the pressure P3' of the mixture of pressure-boosted air (P5-P3') exceeds or falls below a threshold or predetermined value.

In this way, the blow off valve 52 can be used to control or limit the pressure difference between the pressure P5 and pressure P3' (P5-P3') supplied to the turbocharger 22 as the blow off valve 52 can be opened to vent any excess or shortfall in pressure P5 generated by the electric compressor 40. Another example of when the blow off valve 52 may vent pressure-boosted air is when the pressure P3' of the air and exhaust fluid mixture prior to turbine 36 of the turbocharger 22 has reached an optimal or desired value the blow off valve 52 can open to prevent the pressure P3' exceeding the desired or optimal value. A further example is when the pressure P5 being produced by the electric compressor 40 has reached a desired or optimal value, the blow off valve 52 can open to prevent the pressure P5 exceeding the desired or optimal value.

Alternatively, the blow off valve 52 can be opened to allow the electric compressor 40 to ramp up to a desired speed. By opening the blow off valve 52 while accelerating the electric motor 42, the load on the electric motor 42 is decreased as the pressure P5 within the compressor outlet conduit 50 is reduced due to the venting of the pressure-boosted air. This means that the electric motor 42 can accelerate to the desired or optimal speed more quickly and once the desired compressor 46 speed has been achieved, the blow off valve 52 can then be shut and the pressure-boosted air supplied to the turbocharger 22 via the engine exhaust conduit 34 when the check value 54 is open or opened. This will provide even more aggressive turbocharger speed increases at the early part of the transient and thus further improve the engine 10 load acceptance capability.

Referring to the third embodiment of the turbocharged engine system 300 in FIG. 3, the compressor outlet conduit 50 comprises an isolator valve 56 downstream of the electric compressor 40 prior to the connection with the engine exhaust conduit 34. The turbocharged engine system 300 further comprises a bypass conduit 58 that is connected between the compressor inlet conduit 48 and compressor outlet conduit 50 in parallel with the electric compressor 40. The bypass conduit 58 comprises a compressor bypass valve 60.

The isolator valve 56 is configured to control the flow of pressure-boosted air from the electric compressor 40 into the exhaust subsystem 32. The isolator valve 56 can do this by occluding the compressor outlet conduit 50 partially or completely, thereby limiting the injection of pressure-boosted air form the compressor 40. In this way, the pressure P3' of the air and fuel mixture prior to entry into the turbine 36 of turbocharger can be controlled. For example, this can be used to ramp up the electric motor 42 to a desired speed prior to opening. Further, the occlusion of the compressor outlet conduit 50 by the isolator valve 56 can prevent flow of the exhaust fluid from the exhaust subsystem 32 into or towards the electric compressor 40.

The bypass valve 60 is configured to vent the pressure-boosted air produced by the electric compressor 40 back to the inlet of the electric compressor 42 prior to its entry into the exhaust subsystem 32. For example, the bypass valve 60 can open to prevent pressure building up within the compressor outlet conduit 50 when the isolator valve 56 partially or completely occludes the compressor outlet conduit 50, such as when the isolator valve 56 is shut and the electric motor 42 is ramping up to a desired speed. Alternatively, the bypass valve 60 can be actuated to relieve pressure or increase the flow through the electric compressor 40 as it approaches its surge line. The electric compressor 40 will approach its surge line when the isolator valve 56 (or the check valve 54 in the second embodiment) is closed and the electric compressor 40 is still spinning, or when the pressure at P3' is equal to or close to being equal to P5 such that the flow of air through the electric compressor 40 will naturally decrease.

An immediate injection of pressure-boosted air can be supplied by closing the isolator valve 56 and opening the bypass valve 60 while the electric compressor 40 is running. During this time, the electric compressor 40 can be ramped or spun up to a desired, or maximum, speed raising the pressure P5 of the pressure-boosted air to a desired, or maximum, value. When a load increase occurs on or is requested by the internal combustion engine 10, the isolator valve 56 can then be opened and the bypass valve 60 closed. This causes an instantaneous injection of pressure-boosted air from the electric compressor 40 into the exhaust subsystem 32. The instantaneous injection rapidly accelerates the turbocharger 22 and rapidly increases the boost pressure, enabling rapid load acceptance by the internal combustion engine 10.

Other embodiments are envisaged where a turbocharged engine system comprises alone or combination any of the blow-off valve of the second embodiment, the check valve of the second embodiment, the isolator valve of the third embodiment and the bypass valve of the third embodiment.

Figure 4:
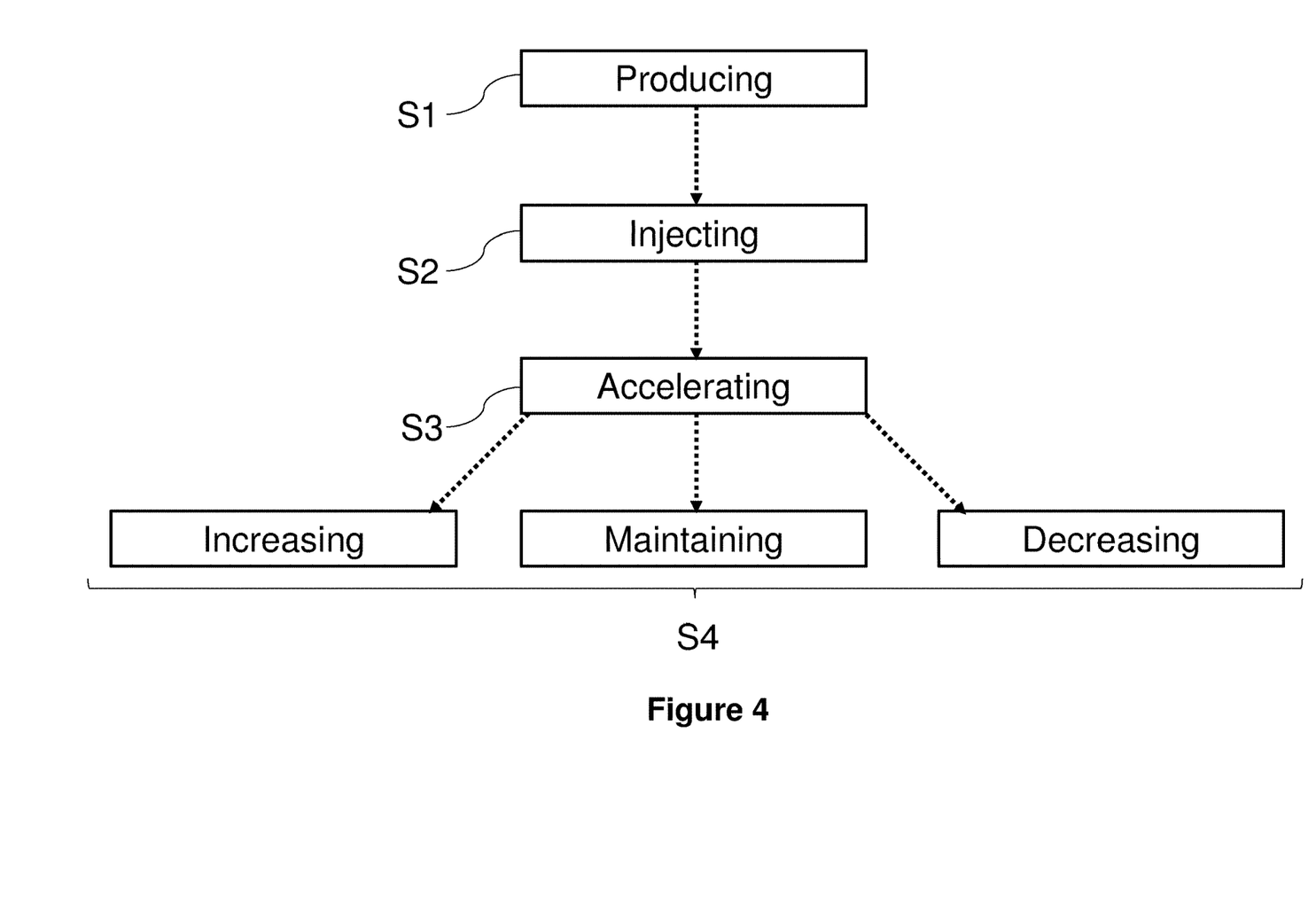
FIG. 4 is a flowchart depicting a method of increasing the boost pressure supplied to an internal combustion engine by a turbocharger in accordance with the present invention.

FIG. 4 of the drawings depicts a method of increasing the boost pressure supplied to the internal combustion engine 10 by a turbocharger 22 using the turbocharged engine systems 100, 200, 300 of FIG. 1, FIG. 2 and FIG. 3.

The method begins with the electric compressor 40 producing a stream of compressed fluid in step S1. The stream of compressed fluid, typically air, is produced by the action of the compressor 46 being rotated by the electric motor 42. The pressure P5, mass and flow of the compressed fluid is therefore controlled by the speed of the electric motor 42.

This stream of compressed fluid is then injected or added into the exhaust stream from the internal combustion engine in step S2. The stream of compressed fluid form the electric compressor 40 and exhaust stream mix within the engine exhaust conduit 34 to produce a pressure-boosted exhaust stream.

This pressure-boosted exhaust stream can then accelerate the turbine 36 of the turbocharger 22 in step S3, which causes the turbocharger 22 to supply a great boost pressure to the internal combustion engine 10.

Subsequently in step S4, the amount, or mass flow, of the pressure-boosted air being injected into the exhaust subsystem is increased, maintained or decreased. The change or maintenance of the production of the pressure-boosted air is typically made in reference to the boost pressure and the engine load by controlling the speed of the electric compressor 40 or by actuating the isolator valve 56, bypass valve 60, check valve 54 and/or blow-off valve 52 as is described above for the first, second and third embodiments.

The invention claimed is:
1. A turbocharged engine system comprising:
   an internal combustion engine, the internal combustion engine in fluid communication with an intake subsystem and an exhaust subsystem;
   a turbocharger arranged to supply a boost pressure to the internal combustion engine via a turbine coupled to a compressor wheel, the turbine being located in the exhaust subsystem and the compressor wheel being located in the intake subsystem;

an electric compressor arranged to inject a compressed fluid into the exhaust subsystem upstream of the turbine such that, in use, the compressed fluid injected by the electric compressor into the exhaust subsystem maintains a speed of or accelerates the turbine and thereby maintains or increases the boost pressure supplied to the internal combustion engine by the turbocharger; and one or more control valves arranged to control an injection timing, pressures, and quantity of the compressed fluid injected into the exhaust by the electric compressor, wherein the one or more control valves comprise a bypass valve arranged to bypass the electric compressor, wherein the bypass valve is configured to lower the pressure of the compressed fluid injected by the electric compressor and increase a mass flow through the electric compressor to prevent compressor surge events on the electric compressor.

2. The turbocharged engine system of claim 1, wherein the one or more control valves comprises an isolator valve arranged to prevent or inhibit the stream of compressed fluid into the exhaust subsystem.

3. The turbocharged engine system of claim 1, wherein the one or more control valves comprises a blow-off valve arranged to control venting of the compressed fluid produced by the electric compressor into an external environment.

4. The turbocharged engine system of claim 1, wherein the one or more control valves comprises a check valve arranged to prevent fluid in the exhaust subsystem flowing towards the electric compressor.

5. A method of controlling a boost pressure supplied to an internal combustion engine by a turbocharger, said method comprising the steps of:

producing a stream of compressed fluid;

injecting the stream of compressed fluid into an exhaust stream of the internal combustion engine to produce a pressure-boosted exhaust stream;

controlling a speed of a turbine of the turbocharger using the pressure-boosted exhaust stream such that the boost pressure supplied to the internal combustion engine is controlled; and using one or more control valves to control an injection timing, pressures and quantity of the compressed fluid injected into the exhaust by an electric compressor, wherein the one or more control valves comprises a bypass valve arranged to bypass the electric compressor, wherein the bypass valve is configured to lower the pressure of the compressed fluid injected by the electric compressor and increase a mass flow through the electric compressor to prevent compressor surge events on the electric compressor.

6. The method of claim 5, wherein the method controls the boost pressure supplied to the internal combustion engine by maintaining or increasing the boost pressure supplied to the internal combustion engine, such that the step of controlling the speed of the turbine comprises the step of maintaining the speed of or accelerating the turbine of the turbocharger using the pressure-boosted exhaust stream, thereby maintaining or increasing the boost pressure supplied to the internal combustion engine.

7. The method of claim 5, wherein the method comprises an additional step of reducing an amount of compressed fluid injected into the exhaust stream when a load of the internal combustion engine or boost pressure approaches, achieves or exceeds a threshold or predetermined value.

8. The method of claim 7, wherein the step of reducing the amount of compressed fluid injected into the exhaust stream comprises a step of restricting the flow of compressed fluid into the exhaust stream.

9. The method of claim 7, wherein the step of reducing the amount of compressed fluid injected into the exhaust stream or the step of increasing the amount of the compressed fluid injected into the exhaust stream comprises a step of venting at least some of the compressed fluid into an external environment or bypassing the electric compressor.

10. The method of claim 5, wherein the method comprises an additional step of increasing an amount of the compressed fluid injected into the exhaust stream when a load of the internal combustion engine or the boost pressure approaches, is below or falls below a threshold or predetermined value.

11. The method of claim 10, wherein the step of increasing the amount of the compressed fluid injected into the exhaust stream comprises a step of increasing the flow of compressed fluid into the exhaust stream.

12. The method of claim 10, wherein the step of increasing the amount of the compressed fluid injected into the exhaust stream comprises a step of increasing a proportion of the compressed fluid stream that is injected into the exhaust stream.

13. The method of claim 5, wherein the compressed fluid is air.

* * * * *